United States Patent
Jones et al.

(10) Patent No.: US 9,208,096 B2
(45) Date of Patent: Dec. 8, 2015

(54) CACHE PRE-FETCHING RESPONSIVE TO DATA AVAILABILITY

(75) Inventors: Andrew Michael Jones, Bristol (GB); Stuart Ryan, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 859 days.

(21) Appl. No.: 12/284,332

(22) Filed: Sep. 19, 2008

(65) Prior Publication Data

US 2009/0307433 A1 Dec. 10, 2009

(30) Foreign Application Priority Data

Nov. 19, 2007 (GB) .................................. 0722707.7

(51) Int. Cl.
*G06F 12/08* (2006.01)

(52) U.S. Cl.
CPC ........ *G06F 12/0862* (2013.01); *G06F 12/0846* (2013.01); *G06F 12/0853* (2013.01); *G06F 12/0895* (2013.01); *G06F 2212/6024* (2013.01); *G06F 2212/6028* (2013.01)

(58) Field of Classification Search
CPC ............ G06F 12/0862; G06F 12/0802; G06F 12/0804; G06F 2212/1024; G06F 2212/45; G06F 2212/602; G06F 2212/6028
USPC .......................................... 711/137, E12.057
See application file for complete search history.

(56) References Cited

U.S. PATENT DOCUMENTS

| | | | |
|---|---|---|---|
| 5,361,391 A | 11/1994 | Westberg | |
| 5,713,003 A | 1/1998 | DeWitt et al. | |
| 5,761,706 A | 6/1998 | Kessler et al. | |
| 5,787,475 A | 7/1998 | Pawlowski | |
| 5,944,815 A | 8/1999 | Witt | |
| 5,956,744 A | 9/1999 | Robertson et al. | |
| 5,983,324 A | 11/1999 | Ukai et al. | |
| 6,173,392 B1 | 1/2001 | Shinozaki | |
| 6,643,743 B1 | 11/2003 | Hum et al. | |
| 6,697,909 B1 | 2/2004 | Wang et al. | |

(Continued)

FOREIGN PATENT DOCUMENTS

| | | |
|---|---|---|
| EP | 1 111 511 A1 | 6/2001 |
| GB | 2454808 | 5/2009 |

(Continued)

OTHER PUBLICATIONS

Anoop Gupta, et al., "Comparative Evaluation of Latency Reducing and Tolerating Techniques", 1991 ACM, p. 254-263.

(Continued)

*Primary Examiner* — Hal Schnee
(74) *Attorney, Agent, or Firm* — Allen, Dyer, Doppelt, Milbrath & Gilchrist, P.A.

(57) ABSTRACT

Systems and methods for pre-fetching data are disclosed that use a cache memory for storing a copy of data stored in a system memory and mechanism to initiate a pre-fetch of data from the system memory into the cache memory. The system further comprises an event monitor for monitoring events that is connected to a path on which signals representing an event are transmitted between one or more event generating modules and a processor. In some embodiments, the event monitor initiates a pre-fetch of a portion of data in response to the event monitor detecting an event indicating the availability of the portion of data in the system memory.

17 Claims, 8 Drawing Sheets

(56) References Cited

U.S. PATENT DOCUMENTS

| | | | |
|---|---|---|---|
| 6,738,867 | B1 | 5/2004 | Kanai |
| 6,792,508 | B1 | 9/2004 | Chauvel et al. |
| 6,862,657 | B1 * | 3/2005 | Grimsrud et al. ............. 711/112 |
| 7,177,985 | B1 | 2/2007 | Diefendorff |
| 7,512,740 | B2 | 3/2009 | Diefendorff |
| 2001/0011330 | A1 | 8/2001 | Hughes et al. |
| 2002/0087801 | A1 | 7/2002 | Bogin et al. |
| 2002/0116584 | A1 | 8/2002 | Wilkerson |
| 2003/0191900 | A1 | 10/2003 | Hooker |
| 2004/0064648 | A1 * | 4/2004 | Brown et al. ................. 711/137 |
| 2004/0148473 | A1 | 7/2004 | Hughes et al. |
| 2004/0199727 | A1 | 10/2004 | Narad |
| 2004/0205300 | A1 | 10/2004 | Bearden |
| 2005/0125644 | A1 * | 6/2005 | Barry et al. ................... 712/233 |
| 2005/0216666 | A1 | 9/2005 | Sih et al. |
| 2006/0075142 | A1 * | 4/2006 | Cornett et al. ................ 709/246 |
| 2006/0085602 | A1 | 4/2006 | Huggahalli et al. |
| 2006/0112229 | A1 | 5/2006 | Moat et al. |
| 2006/0123195 | A1 | 6/2006 | Mukherjee |
| 2006/0294322 | A1 | 12/2006 | Matsuzaki et al. |
| 2007/0043907 | A1 | 2/2007 | Diefendorff |
| 2007/0067577 | A1 | 3/2007 | Henry et al. |
| 2007/0113018 | A1 * | 5/2007 | Brink et al. ................... 711/137 |
| 2007/0124736 | A1 * | 5/2007 | Gabor et al. .................. 718/108 |
| 2007/0204087 | A1 * | 8/2007 | Birenbach et al. ............ 710/264 |
| 2008/0104325 | A1 * | 5/2008 | Narad et al. .................. 711/122 |
| 2008/0168191 | A1 * | 7/2008 | Biran et al. ..................... 710/23 |
| 2008/0183913 | A1 * | 7/2008 | Ryu et al. ........................ 710/25 |
| 2008/0256328 | A1 | 10/2008 | Nagarkar et al. |
| 2008/0263257 | A1 * | 10/2008 | Cain, III et al. .................. 711/3 |
| 2009/0132749 | A1 | 5/2009 | Jones et al. |
| 2009/0132750 | A1 | 5/2009 | Jones et al. |
| 2009/0132768 | A1 | 5/2009 | Jones et al. |
| 2010/0121935 | A1 | 5/2010 | Holt |

FOREIGN PATENT DOCUMENTS

| | | |
|---|---|---|
| GB | 2454810 | 5/2009 |
| GB | 2454811 | 5/2009 |
| GB | 2454809 | 11/2012 |
| JP | 2000-353146 | 12/2000 |
| JP | 2003-242027 | 8/2003 |
| WO | WO 2008/085647 A1 | 7/2008 |

OTHER PUBLICATIONS

Search Report dated Jan. 29, 2009 in connection with United Kingdom Patent Application No. GB0821079.1.

Search Report dated Feb. 3, 2009 in connection with United Kingdom Patent Application No. GB0821080.9.

Search Report dated Jan. 26, 2009 in connection with United Kingdom Patent Application No. GB0821078.3.

Search Report dated Feb. 9, 2009 in connection with United Kingdom Patent Application No. GB0821081.7.

Office Action dated Apr. 18, 2011 in connection with U.S. Appl. No. 12/284,331.

Office Action dated Aug. 19, 2011 in connection with U.S. Appl. No. 12/284,336.

Office Action dated Jan. 4, 2012 in connection with U.S. Appl. No. 12/284,329.

Office Action dated Jul. 25, 2012 in connection with U.S. Appl. No. 12/284,336.

Office Action dated Dec. 19, 2012 in connection with U.S. Appl. No. 12/284,329.

Office Action dated Apr. 11, 2013 in connection with U.S. Appl. No. 12/284,329.

* cited by examiner

CACHE PRE-FETCHING RESPONSIVE TO DATA AVAILABILITY

CROSS-REFERENCE TO RELATED APPLICATIONS

The present application is related to United Kingdom Patent Application No. 0722707.7, filed Nov. 19, 2007, entitled "CACHE MEMORY SYSTEM". United Kingdom Patent Application No. 0722707.7 is assigned to the assignee of the present application and is hereby incorporated by reference into the present disclosure as if fully set forth herein. The present application hereby claims priority under 35 U.S.C. §119(a) to United Kingdom Patent Application No. 0722707.7.

TECHNICAL FIELD

The present invention relates to systems comprising cache memories, and in particular to systems employing data pre-fetching.

BACKGROUND

A very large number of systems involve the retrieval of data from a system memory by a device such as a processor. Many of these systems employ a technique known as data caching which exploits a property of data access known as temporal locality. Temporal locality means data that has been accessed recently is the data most likely to be accessed again in the near future. Data caching involves storing, or caching, a copy of recently accessed data in a cache memory that is accessible more quickly and efficiently than the system memory. If the same data is requested again in the future, the cached copy of the data can be retrieved from the cache memory rather than retrieving the original data from the system memory. As the cache memory can be accessed more quickly than the system memory, this scheme generally increases the overall speed of data retrieval.

To implement caching techniques, processor circuitry typically includes an internal cache memory which is located physically closer to the CPU than the system memory, so can be accessed more quickly than the system memory. When the processor requests data from the system memory a copy of the retrieved data is stored in the cache memory, if it is not stored there already. Some systems provide two or more caches arranged between the CPU and the system memory in a hierarchical structure. Caches further up the hierarchy are typically smaller in size, but can be accessed more quickly by the CPU than caches lower down the hierarchy. Caches within such a structure are usually referred to as level 1 (L1), level 2 (L2), level 3 (L3), . . . caches with the L1 cache usually being the smallest and fastest.

A typical cache memory comprises a series of cache lines, each storing a predetermined sized portion of data. For example, a typical cache memory is divided into 1024 cache lines, each 32 bytes in size, giving a total capacity of 32 kB. Data is usually cached in portions equal to the size of a whole number of cache lines. When an item of data smaller than a cache line is cached, a block of data equal to the size of one or more cache lines containing the data item is cached. For example, the data item may be located at the beginning of the cache line sized portion of data, at the end or somewhere in the middle. Such an approach can improve the efficiency of data accesses exploiting a principle known as spatial locality. The principle of spatial locality means that addresses referenced by programs in a short space of time are likely to span a relatively small portion of the entire address space. By caching one or more entire cache lines, not only is the requested data item cached, but also data located nearby, which, by the principle of spatial locality is more likely to be required in the near future than other data.

Each cache line of the cache memory is associated with address information, known as tags, identifying the region of the system memory from which the data stored in each cache line was retrieved. For example, the tag associated with a particular cache line may comprise the address of the system memory from which the cache line sized portion of data stored in that cache line was retrieved. The cache lines may be stored in a data memory portion of the cache, while the tags may be stored in a tag memory portion of the cache.

When a processor requests data from the system memory, the address of the requested data is first compared to the address information in the tag memory to determine whether a copy of the requested data is already located in the cache as the result of a previous data access. If so, a cache hit occurs and the copy of the data is retrieved from the cache. If not, a cache miss occurs, in which case the data is retrieved from the system memory. In addition, a copy of the retrieved data may be stored in the cache in one or more selected cache lines and the associated tags updated accordingly. In a system comprising a cache hierarchy, when data is requested from the system memory, the highest level cache is first checked to determine if a copy of the data is located there. If not, then the next highest level cache is checked, and so on, until the lowest level cache has been checked. If the data is not located in any of the caches then the data is retrieved from the system memory. A copy of the retrieved data may be stored in any of the caches in the hierarchy.

When applying caching techniques, it is important to ensure that the data stored in a cache represents a true copy of the corresponding data stored in the system memory. This requirement may be referred to as maintaining coherency between the data stored in the system memory and the data stored in the cache. Data coherency may be destroyed, for example, if data in one of the system memory and cache is modified or replaced without modifying or replacing the corresponding data in the other. For example, when the processor wishes to modify data, a copy of which is stored in the cache, the processor will typically modify the cached copy without modifying the original data stored in the system memory. This is because it is the cached copy of the data that the processor would retrieve in future accesses and so, for efficiency reasons, the original data stored in the system memory is not modified. However, without taking steps to maintain coherency, any other devices which access the data from the system memory would access the unmodified, and therefore out of date, data.

Various techniques may be applied to maintain data coherency in cache memory systems. For example, one process, referred to as write-back or copy-back, involves writing or copying data stored in one or more cache lines back to the region of system memory from which the cache lines were originally retrieved (as specified in the address information). This process may be performed in a variety of circumstances. For example, when data stored in a cache line has been modified, the cache line may be copied back to the system memory to ensure that the data stored in the cache line and the corresponding data in the system memory are identical. In another example, when data is copied into the cache as a result of a cache miss, an existing cache line of data may need to be removed to make space for the new entry. This process is known as eviction and the cache line of data that needs to be removed is known as the victim. If the victim comprises modified data, then the victim would need to be written back to the system memory to ensure that the modifications made to the data are not lost when the victim is deleted from the cache.

In some systems, special data coherency routines implemented in software are executed to maintain data coherency. Such routines may periodically sweep the cache to ensure that data coherency is maintained, or may act only when specifically required, for example when data is modified or replaced. These routines may include write-back or copy-back processes.

Some systems employ a technique known as data pre-fetching in which data may be retrieved, possibly speculatively, before it is actually needed in order to increase the overall speed of memory access. Data pre-fetches may be speculative in the sense that the pre-fetched data may not eventually be required. In one example of data pre-fetching, when executing a code loop in which an item of data needs to be retrieved within each iteration of the loop, the data required for a particular iteration may be pre-fetched during the preceding iteration. In this way, at the point the data is actually required, it does not need to be retrieved at that time. In another example, in highly integrated multimedia systems, very large quantities of data are manipulated, typically in a linear fashion, in a technique known as data streaming. In such applications, the future access patterns of data may be known some time in advance. In this case, data required in the future may be pre-fetched so that it is immediately available when eventually required.

Typically, pre-fetched data is stored in a cache and treated as cached data. In this way, when the pre-fetched data is actually requested, the cache will be checked to determine whether the requested data is located there. Due to the earlier data pre-fetch, a copy of the data can be retrieved from the cache, rather than accessing the system memory. Pre-fetching data into a cache is useful even in applications involving data accesses where the property of temporal locality do not apply. For example, in data streaming applications, data may only be used a single time, so temporal locality does not apply in this case. However, for the reasons given above caching pre-fetched data is advantageous.

Many processor architectures provide special pre-fetch instructions which allow software to cause data to be pre-fetched into a cache in advance of its use. Examples of such instructions include pre-fetch, preload or touch instructions. In such cases a cache normally communicate via a special interface which allows the cache to perform actions when a special instruction is executed by the processor. Data may be pre-fetched into any cache present in a cache hierarchy, such as a level 1 cache or level 2 cache. In some systems, pre-fetching data into a level 2 cache may be performed as a consequence of issuing a request to pre-fetch data into the level 1 cache.

A limiting factor in the performance of many systems is the delay between a CPU requesting data from memory and the data actually being supplied to it. This delay is known as memory latency. For example, the memory latency of highly integrated systems is typically 10-100 times the duration of the execution of a single instruction by the CPU. With the continuing development of processors, CPU clock rates are increasing rapidly, resulting in increasing demand for higher rates of data access. Even with improvements in the speed of memory access, the effects of memory latency are becoming more significant as a result.

In many applications, data is transferred to a system memory for use by a processor at a later time. In order to reduce memory latency, this data may be pre-fetched into a cache once the transfer is complete by executing appropriate instructions. High level languages do not have special pre-fetch instructions or commands built in and so CPU architecture dependent assembler inserts must be used. One problem is that the use of these inserts makes code non-portable.

A piece of software being executed by a processor may be made aware of the availability of data by means of an interrupt generated by the part of the system that has performed the data transfer. The software is made aware that the data is ready by handling the interrupt. However, the time between the data being available in the system memory and the time a the processor actually requires it may be short. One problem is that there is often a significant delay between the interrupt being generated and the software acting upon it to initiate a data pre-fetch using one or more instructions. Furthermore, the execution of instructions may take a significant period of time to complete. For this reason, even if an instruction is executed to pre-fetch data, the data may not be available in the cache at the time the data is required because the pre-fetch was not initiated sufficiently in advance for the pre-fetch operation to be completed in time.

There is a need, therefore, for a system and method for pre-fetching data which is as fast and efficient as possible and in which a data pre-fetch is initiated as early as possible.

SUMMARY

The present invention solves these and other problems associated with existing techniques.

According to a first aspect, the present disclosure provides a system for pre-fetching data comprising: a cache memory for storing a copy of data stored in a system memory; and means to initiate a pre-fetch of data from the system memory into the cache memory; wherein the system further comprises: an event monitor for monitoring events, the event monitor being connected to a path on which signals representing an event are transmitted between one or more event generating modules and a processor; the event monitor being arranged to initiate a pre-fetch of a portion of data in response to the event monitor detecting an event indicating the availability of the portion of data in the system memory.

According to a second aspect, the present disclosure provides a method for pre-fetching data comprising the steps of: monitoring interrupts on an interrupt path on which interrupt signals are transmitted between one or more interrupt generating modules and a processor; and initiating a pre-fetch of a portion of data in response to detecting an interrupt indicating the availability of the portion of data in a system memory; wherein the step of initiating a pre-fetch includes initiating a pre-fetch prior to the time the processor acts upon the detected interrupt.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
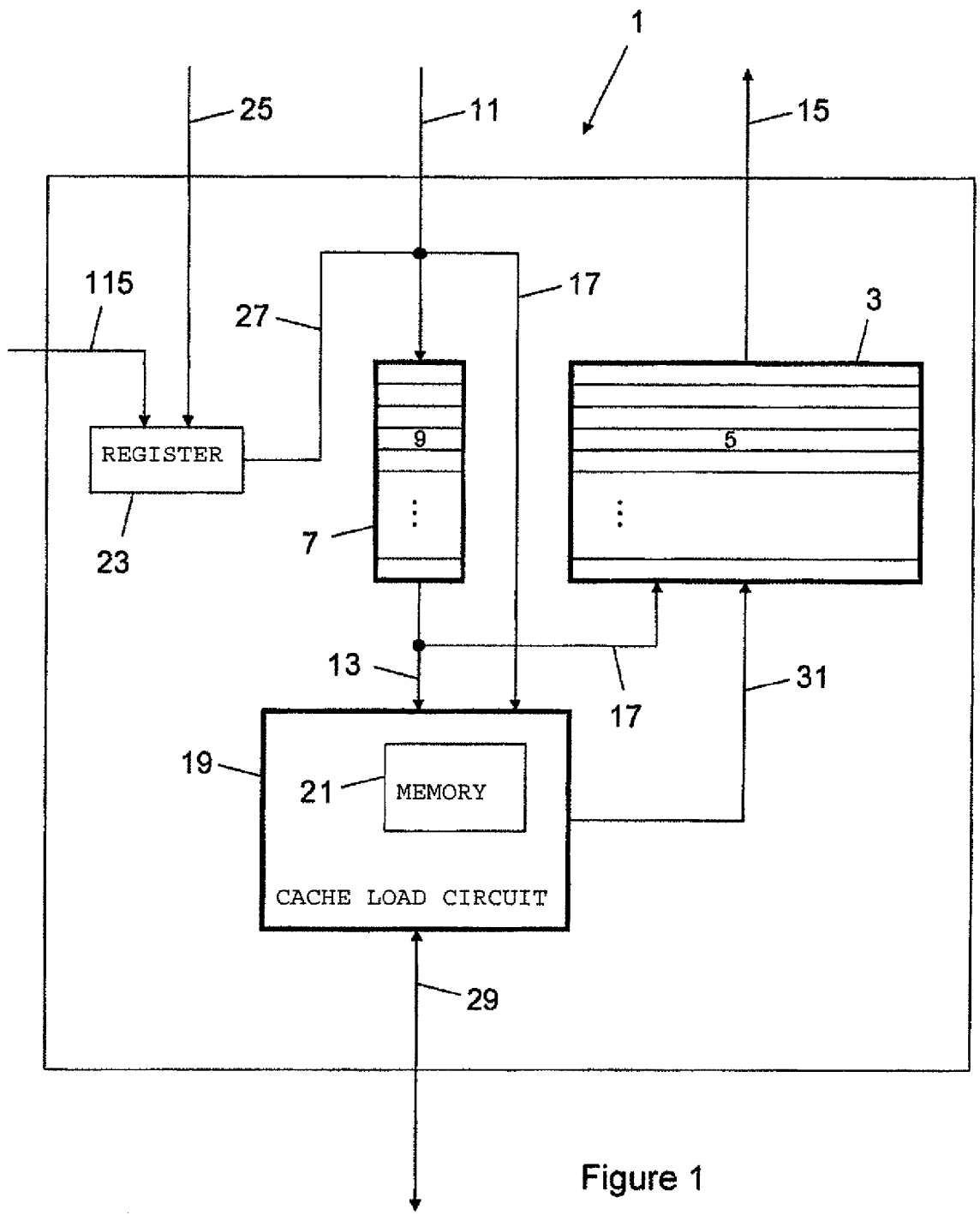
FIG. 1 is a schematic diagram of a cache memory system in a first embodiment of the present disclosure.

FIG. 1 is a schematic diagram of an exemplary cache memory system embodying the present disclosure. The system, referred to below simply as cache 1, comprises a data memory 3 for storing one or more cache lines 5 of data and a tag memory 7 for storing address information in the form of a series of tags 9. For each cache line 5 in the data memory 3, there is a corresponding tag 9 in the tag memory 7. The cache 1 also comprises a cache load circuit 19 used to store data in the data memory 3. It is understood that the present disclosure may be used in a variety of cache systems and is not limited to the arrangement illustrated in FIG. 1.

Figure 2:
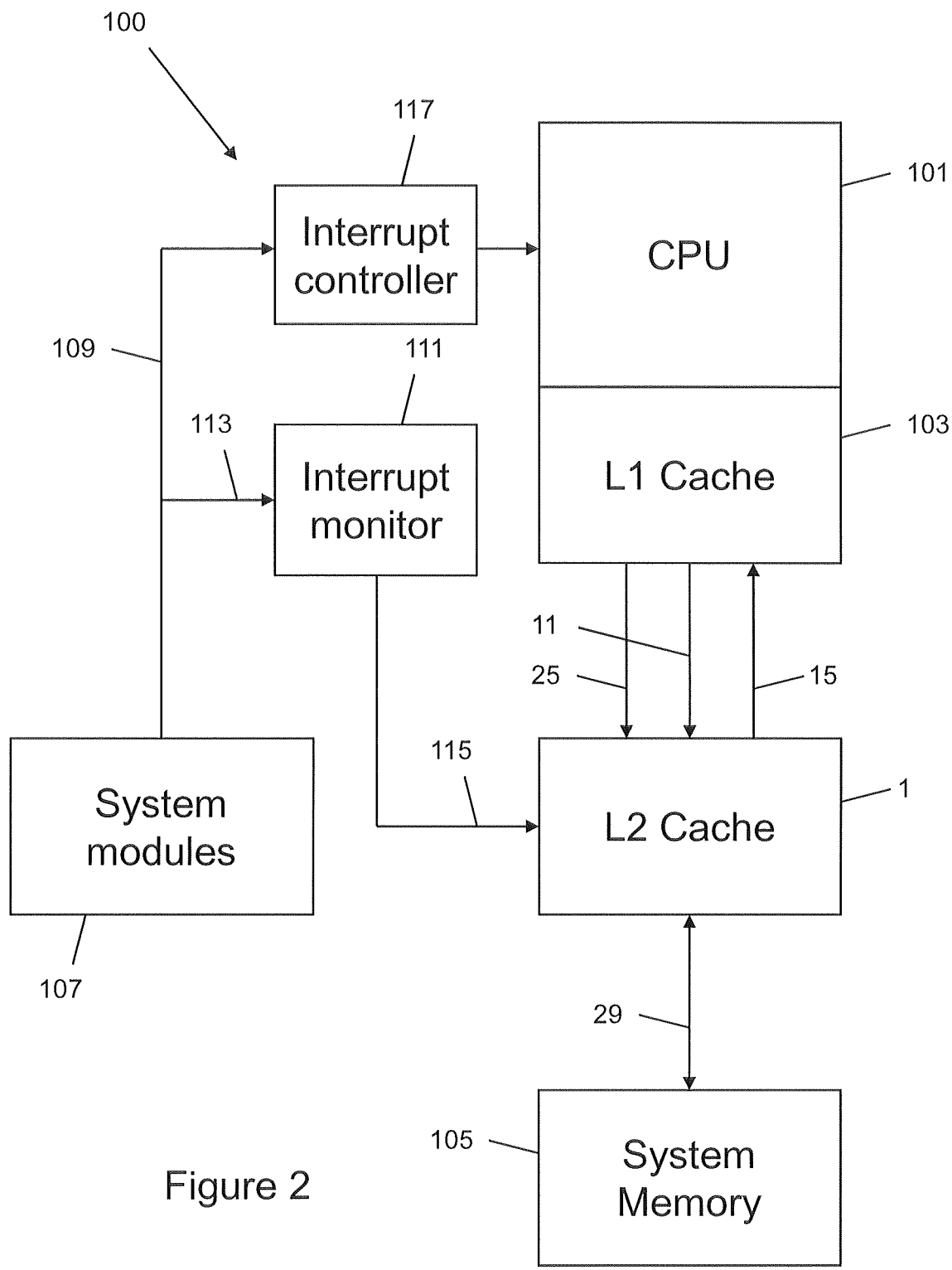
FIG. 2 is a schematic diagram of a system comprising the cache shown in FIG. 1.

FIG. 2 illustrates a system 100 comprising the cache 1 shown in FIG. 1. As shown in FIG. 2, in this embodiment, the cache 1 is a level 2 cache functionally located between a processor 101 comprising a level 1 cache 103 and a system memory 105. However, it is understood that the cache shown in FIG. 1 may be used as any level of cache, in any cache hierarchy arrangement or as a sole cache. The term system memory may refer to a specific memory device or to a group of two or more memory devices. In general the system memory represents a general memory space formed from the whole, or part of, the individual memory spaces of one or more memory devices. The processor 101 directly accesses the level 1 cache 103. The level 1 cache 103 communicates with the level 2 cache 1 via bus lines 11, 15 and 25 and the level 2 cache 1 communicates with the system memory 105 via bus line 29. The system 100 also comprises other modules, represented in FIG. 2 collectively as block 107. These modules may include, for example, a module having DMA (Direct Memory Access) capability. As described in greater detail below, the modules 107 also comprise a module which generates interrupts supplied to the processor. As well as the processor 101, one or more of the modules 107 may also access the level 2 cache 1 via additional bus lines (not shown).

With reference to FIG. 2, when the processor 101 issues a request for retrieval of data stored in the system memory 105 the following process occurs. First, the data access request is transmitted to the level 1 cache 103 which determines whether it stores a copy of the requested data. If so then the copy of the requested data is retrieved from the level 1 cache 103 and provided to the processor 101. In this case, no data retrieval involving the level 2 cache 1 or the system memory 105 is made. If the level 1 cache 103 does not store a copy of the requested data then the data access request is forwarded from the level 1 cache 103 to the level 2 cache 1. In this case, the level 2 cache 1 determines whether it stores a copy of the requested data. If so then the copy of the requested data is retrieved from the level 2 cache 1 and provided to the level 1 cache 103, which in turn provides the data to the processor 101. If the level 2 cache 1 does not store a copy of the requested data then the data is retrieved from the system memory 105. In this case, the level 2 cache 1 requests the data from the system memory 105 and provides the retrieved data to the level 1 cache 103, which in turn provides it to the processor 101.

With reference to FIG. 1, the level 2 cache 1 performs the following process when a data access request is received by it. First, a determination is made as to whether a copy of the data specified in the data access request is already present in the data memory 3 of the cache 1. The data access request identifies the address of the system memory 105 at which the requested data is located. The address of the requested data is supplied to the tag memory 7 via line 11 and compared to the tags 9 stored in the tag memory 7. Each tag 9 comprises an address of the system memory 105 from which a corresponding cache line 5 of data was originally retrieved. If the address of the data presently being requested matches an address specified by a tag 9, this indicates that the data memory 3 does contain a copy of the requested data. A match is indicated by asserting a hit signal on line 13, which is received by the data memory 3 and the cache load circuit 19. When the hit signal is asserted, the cache line 5 of data corresponding to the tag 9 causing the hit is retrieved from the data memory 3 and output from the data memory 3 and cache 1 on line 15.

If no match is found between the address of the requested data and any of the tags 9 in the tag memory, the hit signal is not asserted. In this case the requested data is retrieved from the system memory 105 using the cache load circuit 19 in the manner described below. A copy of the data retrieved from the system memory 105 by the cache load circuit is stored in the data memory 3. The data is then output from the data memory 3 and cache 1 on line 15.

The cache load circuit 19 comprises a memory 21 which stores a queue of pending cache load operations. Each cache load operation represents an item of data to be retrieved from the system memory 105 and includes the memory address of the data item. A cache load operation may also contain other relevant information, such as whether the data is required as the result of a pre-fetch or some other type of data access. The address received on line 11 is provided to the cache load circuit 19 via line 17. As mentioned above, the cache load circuit 19 also receives the hit signal via line 13. When the hit signal on line 13 is not asserted, the cache load circuit 19 adds a cache load operation to the queue stored in the memory 21 based on the address received on line 17. The cache load circuit 19 processes each cache load operation in turn, for example in the order in which they were added to the queue. A newly added cache load operation will eventually be processed by the cache load circuit resulting in the data being retrieved from the system memory 105, stored in the data memory 3 and output from the cache 1.

To process a cache load operation, the cache load circuit identifies the address of the data to be cached and issues a suitable data access request on line 29 which is received by the system memory 105. When the requested data is provided back to the cache load circuit, the cache load circuit identifies one or more suitable cache lines in the data memory in which to store the received data. These may comprise currently vacant cache lines. However, if there are insufficient free cache lines, it may be necessary to remove one or more existing cache lines of data to make room for the new data, in which case the write-back process described above may be required. The cache load circuit then transmits a load command to the data memory via line 31 comprising a copy of data to be cached, the system memory address from which the data was retrieved and the cache lines identified to store the data. The copy of the data is then stored in the cache lines specified in the load command and corresponding tags are added to the tag memory based on the address information specified in the load command.

A technique by which data is pre-fetched as early as possible will now be described. Briefly, in the embodiments described below, an interrupt monitor is provided which monitors interrupts generated within the system and is arranged to initiate a data pre-fetch if an interrupt having certain characteristics is detected. In one example, described in greater detail below, when an interrupt resulting from the completion of a data transfer to system memory is detected, a data pre-fetch may be initiated to pre-fetch the transferred data into a cache.

A system embodying the present disclosure may initiate a pre-fetch of data using any suitable technique. In the illustrated embodiment, the cache 1 further comprises a memory 23, which in this embodiment is in the form of a 32 bit write-only register. When a value is written to the register 23, this is interpreted by the system as a request to pre-fetch data into the cache. The value written to the register includes information identifying the address of the data to be pre-fetched and may also include information defining the size of the portion of data to be pre-fetched. In this way, a cache line of data may be pre-fetched into the cache 1 using a single 32 bit write operation. Write accesses to the register are monitored, and when a value is written, the address represented by the written value is communicated to the tag memory via line 27 connected to line 11. An address received by the tag memory via line 27 is handled in the same way as an address received on line 11 as described above. Thus, writing a value to the register 23 causes a data pre-fetch to be initiated.

A value may be written to the register 23 by one or more parts of the system. For example, a value may be written to the register by the level 1 cache 103 and processor 101, or by one or more of the system modules 107. In one embodiment, the register comprises one or more access ports, each access port providing access to the register for one or more parts of the system. For example, a first access port may provide access to the register for the processor and level 1 cache while a second access port provides access for other system modules. This arrangement allows access to the register to be controlled more easily.

The modules 107 comprise one or more modules capable of generating interrupts. For example, one of the modules 107 has DMA (Dynamic Memory Access) capability and which can transfer data to the system memory to be used later by the processor. When the DMA module has completed a data transfer, it generates an interrupt signal which is communicated to an interrupt controller 117 via interrupt line or path 109. The interrupt controller also receives interrupts resulting from various other events within the system, either on the same interrupt line 109 or another interrupt line. The interrupt controller prioritises the received interrupts and forwards them to the processor in order of priority. The interrupt generated by the DMA module informs the processor that the data transfer is complete and that the data is thus available from the system memory.

The system illustrated in FIG. 2 comprises an interrupt monitor 111 which monitors interrupt signals occurring on interrupt line 109 and any other interrupt lines. As shown in FIG. 2, the interrupt monitor is connected to interrupt line 109 at a point between the module that generated the interrupt and the interrupt controller. In this way, the interrupt monitor is made aware of the occurrence of an interrupt as early as possible, and in many cases before the interrupt is received by the processor. This is because there may be a delay between the interrupt controller receiving interrupt signals and forwarding the interrupt to the processor, for example due to the prioritising of interrupts. Since the interrupt monitor detects an interrupt substantially simultaneously to the time it is received by the interrupt controller, any delay introduced by the interrupt controller in forwarding the interrupt to the processor is eliminated. This increases the likelihood that the pre-fetch will be completed before the processor requires the data, thus hiding any delay in accessing the data from the processor.

The interrupt monitor is arranged to initiate a pre-fetch of data when a relevant interrupt is detected. A relevant interrupt is one which signals that an event has occurred for which a data pre-fetch is necessary or desirable, and possible. One example is when a specific data transfer to the system memory by a DMA module is complete. In order to initiate a data pre-fetch, the interrupt monitor outputs suitable command signals on line 115 which are received by the cache 1. For example, the command signal may include the address of the data to be pre-fetched and the size of the portion of data to be pre-fetched. In embodiments in which data pre-fetching is initiated by writing a value to a register as described above, the command signals comprise the appropriate value to be written to the register. The value may be written via a dedicated register access port or access port shared by other modules, such as one shared by modules represented by block 107. In this way a data pre-fetch is initiated as soon as possible after the detection of the interrupt indicating that a pre-fetch can be performed.

In the arrangement described above, a dedicated interrupt monitor is provided which monitors interrupts and initiates pre-fetching of data accordingly. In many cases, this arrangement allows data to be pre-fetched earlier than would be the case if pre-fetching were initiated by executing a special pre-fetch instruction. This is because there may be some delay between the processor receiving an interrupt and acting upon it by executing a pre-fetch instruction. Delays may result, for example, from the processor concurrently performing other tasks. Furthermore, the execution of a pre-fetch instruction may take a significant time to complete. Since, in this embodiment, the interrupt monitor comprises a dedicated and autonomous device, it is able to act more quickly upon the detection of interrupts using a means to initiate a pre-fetch that is fast simple. Furthermore, by monitoring interrupts in the manner described above, the overall performance is increased without requiring high level software to be changed.

In some embodiments, the interrupt monitor is arranged to distinguish between different interrupts and to initiate pre-fetches accordingly. For example, the address of the data that is pre-fetched, and other aspects of the pre-fetch such as the amount of data pre-fetched, may depend on the interrupt detected. In the example given above, when an interrupt is detected signalling the end of a data transfer into the system memory, the data to be pre-fetched is the transferred data. However, other interrupts may trigger pre-fetching of other data. The detection of some types of interrupt may not result in any pre-fetching being performed.

In order to achieve this, the interrupt monitor comprises a memory for storing information associating each of one or more interrupts with a corresponding data pre-fetch that should be initiated when the associated interrupt is detected. In one embodiment, the memory stores a table comprising an entry for each interrupt the interrupt monitor is capable of detecting. Each entry identifies an interrupt together with information characterising the pre-fetch associated with that interrupt. A pre-fetch may be characterised by factors such as the address of the data to be pre-fetched and the size of the portion of data to be pre-fetched. In cases where a pre-fetch is initiated by writing a value to a register, as described above, each entry in the table may comprise the appropriate value to be written to the register.

When interrupt signals are detected by the interrupt monitor, the interrupt monitor is arranged to decode the signals and determine the type of interrupt represented by the signals. The interrupt monitor then locates the entry in the table stored in the memory corresponding to the detected interrupt. If no entry exists then no pre-fetch is initiated. If an entry does exist, then the interrupt monitor retrieves the information characterising the pre-fetch associated with the detected interrupt and initiates a pre-fetch of data accordingly. For example, the interrupt monitor may retrieve a value associated with the interrupt and cause this value to be written to the register in the cache. In some cases, the interrupt signals may contain, or be associated with, information at least partially characterising the data pre-fetch. For example, if data is transferred to an arbitrary location in the system memory, the interrupt may be associated with information containing the address at which the data is stored. In these cases, the interrupt monitor uses the information to initiate a data pre-fetch.

In one embodiment, the interrupt monitor is separate from the cache system. However, in other embodiments the interrupt monitor may be integrated within the cache system. In this case, rather than writing a value to the register, the interrupt monitor may be arranged to output a simple logic signal to trigger the pre-fetch.

In the embodiments described above, interrupts are monitored, and when certain interrupts are detected, this is used to initiate a pre-fetch of data. However, it is understood that system events other than interrupts may be monitored and when certain events occur, this may be used to initiate a pre-fetch of data. In this case, the interrupt monitor is replaced with a means to monitor relevant system events and arranged to initiate pre-fetching of data accordingly. For example, the monitoring means may monitor signals produced as a result of certain events occurring.

A further embodiment of the present disclosure will now be described with reference to FIGS. 4 to 9. In broad terms, in this embodiment there is provided a cache memory comprising: storage means; and monitoring means arranged to monitor at least one interrupt to a processing element, and, responsive to detecting one of the at least one interrupts being asserted, cause the cache memory to fetch data from an address of an external memory device associated with the interrupt and store the data in the storage means.

As mentioned above, a disadvantage of known systems is that known software executes a pre-fetch instruction after it is known that the requested data is in main memory, but before software requires the data to be accessed as part of its ongoing computations. However, the time period between when the CPU is made aware that the data is ready (typically by interrupt) and when the CPU demands it for its computation may be short. If a pre-fetching request cannot be issued sufficiently in advance of demand then the effectiveness of the pre-fetch is limited.

This embodiment arranges for data to be resident in an L2 cache, and therefore rapidly accessible, shortly before a CPU will request said data. Specifically, the L2 cache has logic which is able to eavesdrop on the assertion of specific interrupts. This information can be used to trigger the pre-fetch of data at specific locations into the L2 cache. This means that data can begin to be fetched in general before, or at worst simultaneously to, the time at which the CPU is interrupted to be made aware of the readiness of this data. This issuing of an earlier pre-fetch request increases the likelihood that all of the delay in accessing main memory will be hidden to the CPU.

FIGS. 3 to 7 illustrate a system comprising a level 2 cache. FIG. 8 illustrates a further embodiment of the present disclosure.

Figure 4:
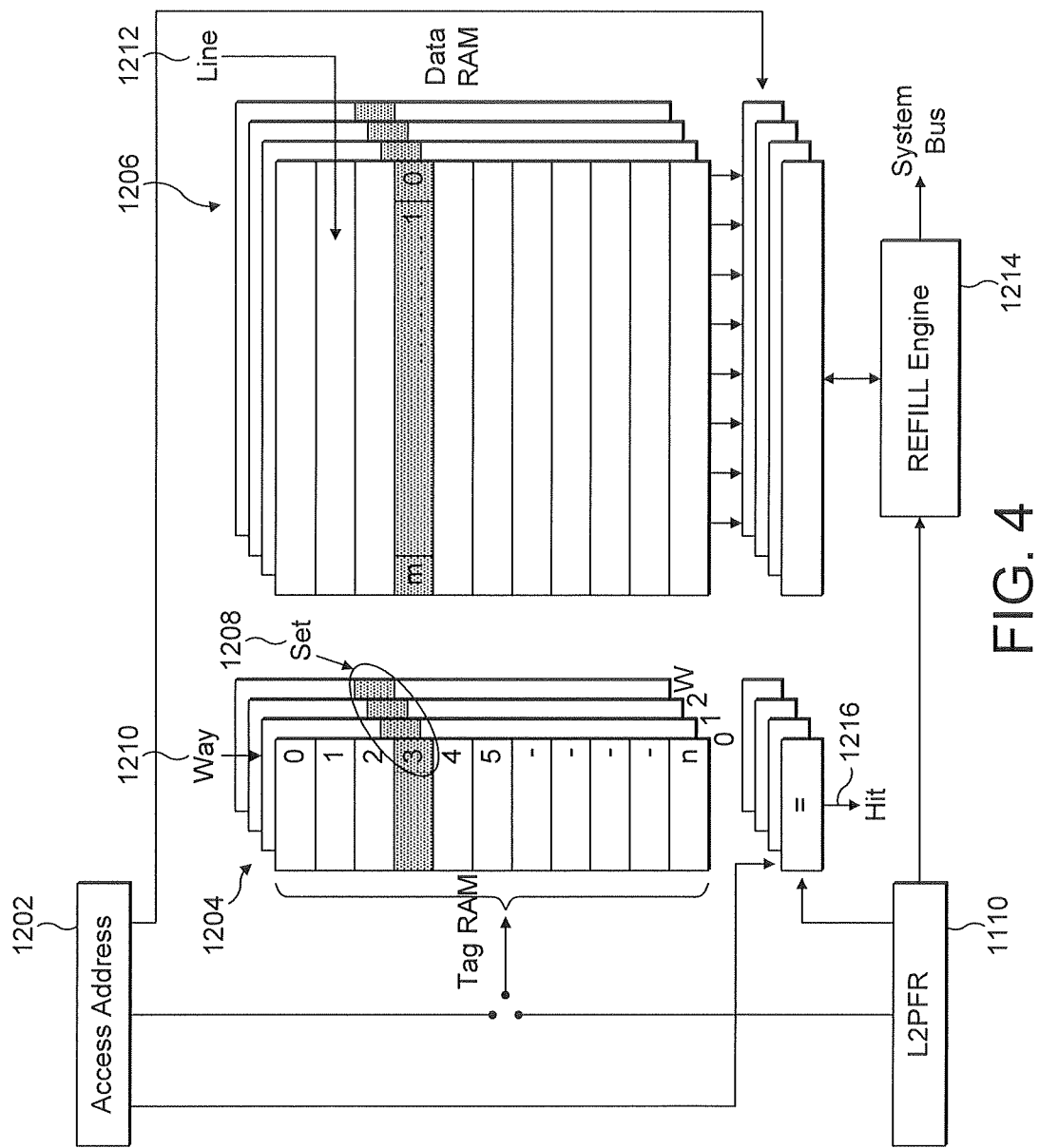
FIG. 4 shows the internal structure of a level 2 cache.

In the system shown in FIG. 4, the level 2 (L2) cache has a target port dedicated to accessing a special register called an L2PFR (L2 pre-fetch register). The use of this register allows CPU and non-CPU requesters to cause data to be fetched into the L2 cache before it is used, therefore avoiding having to suffer the delay incurred when the CPU fetches on demand.

The L2PFR may be implemented as a 32-bit write-only register. Writing a 32-bit value to this register may cause the naturally-aligned 32-byte block—whose address is specified by bits [31:5] of the value—to be fetched into the L2 cache. The pre-fetch operation can therefore be initiated by a CPU with a standard word write operation.

The procedure followed is that first the address is looked up in the L2 cache. If there is a hit, that is the 32-byte block associated with the address is present in the cache, then there is no further activity and no data is fetched. If there is a miss, which implies that the data is not in the cache then space is allocated in the cache and the 32-byte block is fetched from main memory and placed in the level 2 cache. This pre-fetch mechanism is therefore simple to use within the structure of conventional software and conventional DMA engines.

A common use is when a data buffer is to be transferred from an I/O interface to main memory whereupon the CPU will perform some computation on the data contained in the buffer. In a conventional system a DMA engine maybe deployed to transfer data from an I/O interface (e.g. an Ethernet port, a USB port, a SATA disk interface etc.) into system dynamic random access memory (DRAM). Upon completion of the data transfer the DMA engine would send an interrupt to the CPU to signal that the data is transfer has finished. The interrupt handler in the CPU would schedule the execution of an appropriate routine to deal with the computation to be performed on the data buffer.

The routine may then execute in an expedited manner by using one of two methods:

1). A linked list which specifies the set of transfers to be performed by the DMA is extended by one or more additional items. The first additional item specifies that a single 32-bit datum is to be transferred from system memory to the address of the L2PFR register. The value of the datum is the address of the first byte of the data buffer which has been transferred. Optionally, subsequent additional items are similar except that the value of the datum transferred to the L2PFR register is numerically 32 larger than the previous item. If n additional items were specified (where $1 \leq n \leq (\text{buffer size}/32)$) then this has the effect of pre-fetching some or all of the data buffer into the L2 cache.

2). The transfer proceeds as in a conventional system and an interrupt is sent to the CPU on completion of the DMA. In addition to the conventional actions the interrupt handler writes the address of one or more blocks which contain the data buffer to the L2PFR register. This causes some or all of the data buffer to be requested to be pre-fetched into the L2 cache before the computation routine associated with the data buffer is executed.

Figure 3:
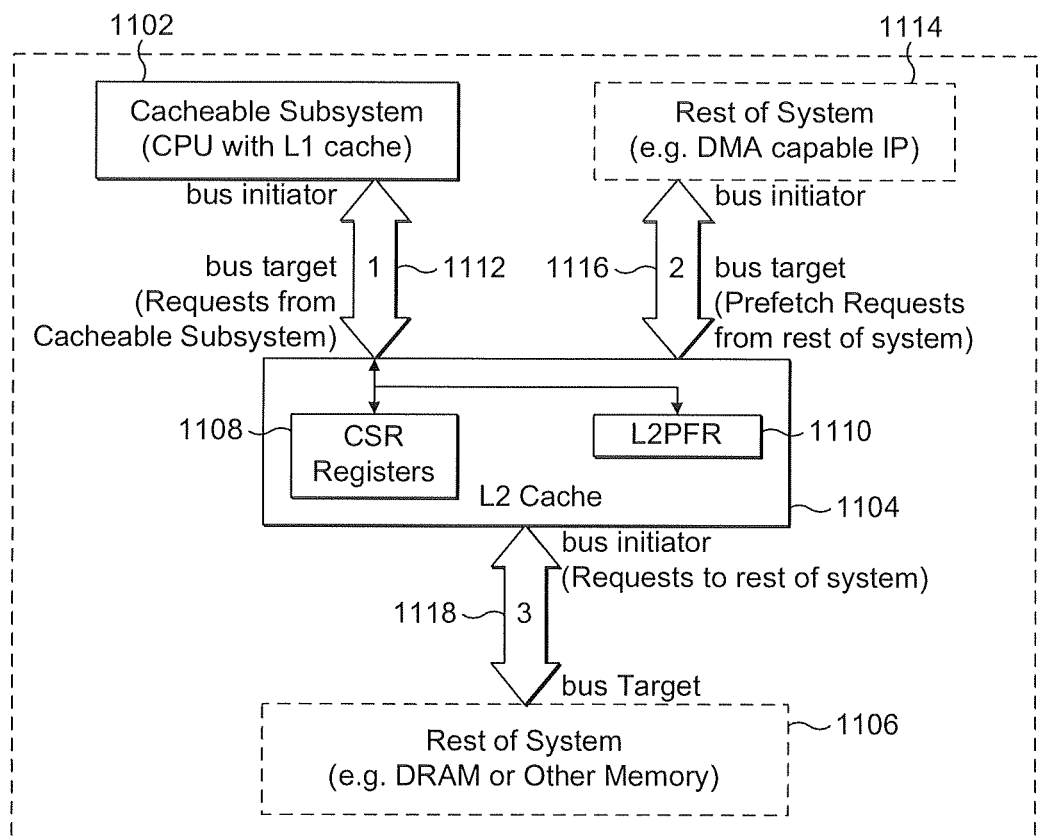
FIG. 3 shows a system topology comprising a level 2 cache.

Reference is now made to FIG. 3, which illustrates a hierarchical memory arrangement. In this arrangement a CPU 1102 (which optionally has a level 1 cache) is supplemented by a separate module known as a level 2 cache 1104. Use of the term level 2 should not be taken to imply exclusive use in systems which have level 1 caches. Nor is there an implication that there is no level 3 or higher level caches. Nonetheless, the level 2 terminology is retained purely for simplicity of exposition.

The level 2 cache (L2 cache) 1104 is functionally located between the CPU 1102 and the rest of the system 1106 so that all of its high performance memory requests have to go via the L2 cache 1104. The L2 cache 1104 is able to service some of its requests from its own contents and other requests is passes on to the rest of the system to be serviced. The L2 cache 1104 also contains a number of configuration and status registers (CSRS) 1108 through which the operation of the L2 cache 1104 may be controlled and monitored.

A top-level diagram of a cache such as the L2 cache 1104 is shown in FIG. 4. The cache comprises an access address 1202, which is the address which is presented by the CPU 1102 to the L2 cache 1104, and a tag RAM 1204 which is the memory to which the access address 1202 is associated. In other words the access address 1202 is compared with the contents of the tag RAM 1204 to determine which data RAM 1206 array (line) should be selected. Data RAM 1206 holds the data which is supplied to the L2 cache 1104. In a set-associative cache an address can only reside in a limited number of places in the cache. The collection of places which a single address may reside is called a set 1208. The collection of addresses which are in the same set is called a way 1210. A block of data associated with a single address in the tag RAM 1204 is a line 1212. A refill engine 1214 is present, which is a functional unit whose responsibility is fetching from main memory data which is not already held in the cache. It does this on demand from a standard access or a pre-fetch.

Figure 6:
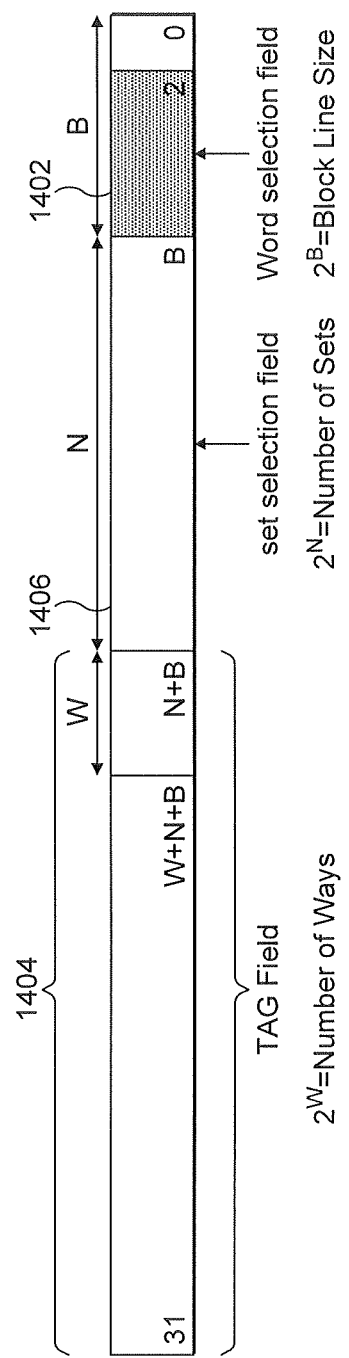
FIG. 6 shows the fields of a 32-bit physical address and how they are interpreted by the L2 cache lookup logic.

As mentioned, this system makes use of a special register called L2PFR 1110, which is an operational register used to initiate a pre-fetch. The L2PFR 1110 is writable by both the CPU 1102 (using the target 1 port 1112) and modules with DMA capability 1114 in the rest of the system (using the target 2 port 1116). When the register is written with a 32-bit operand, the operand is interpreted as a cache line address (see FIG. 6). When an address is submitted to the cache for lookup the address is broken down into a number of fields that are used for different purposes by the hardware. The size and location of each of the fields depends on the size and internal organisation of the cache. An example arrangement of the fields is shown in FIG. 6. A word selection field 1402 specifies which of the 8 4-byte words in the line is the requested word. A tag field 1404 is stored in the tag RAM to uniquely identify the address of the data held in the associated line. A set selection field 1406 is used to determine which set in the cache is looked up.

Figure 5:
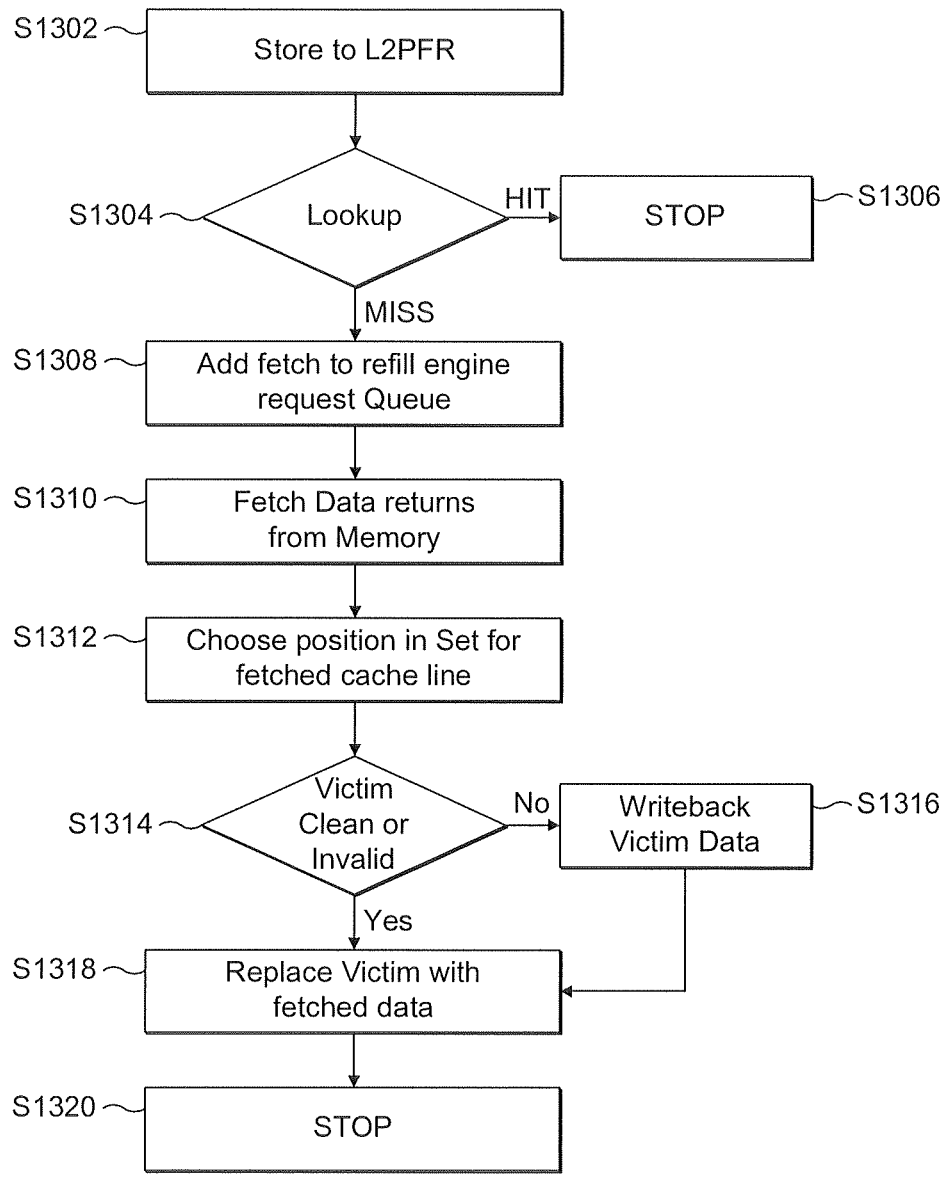
FIG. 5 shows a flow diagram for a pre-fetch procedure.
Figure 7:
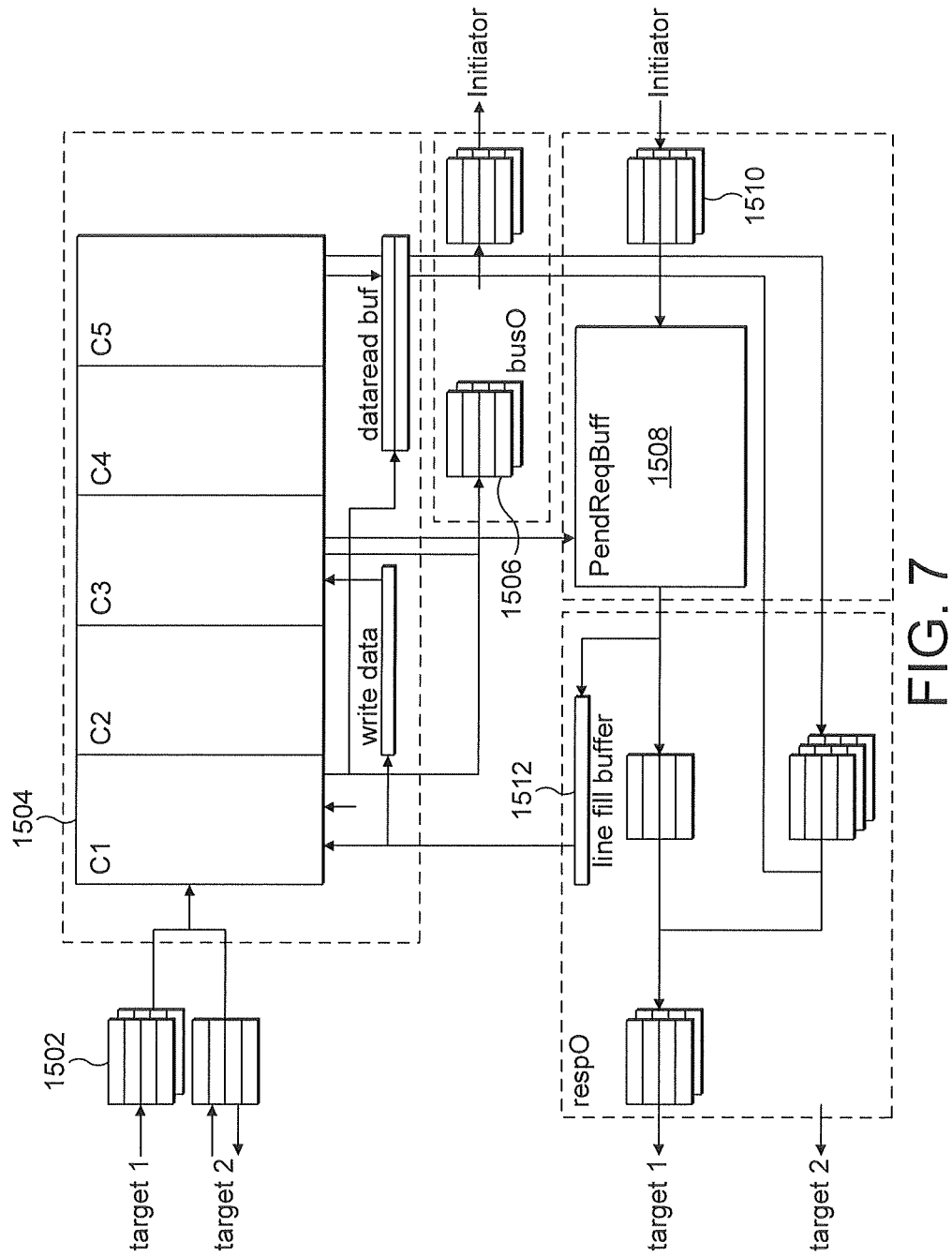
FIG. 7 shows internal buffering and logic for a level 2 cache.
Figure 8:
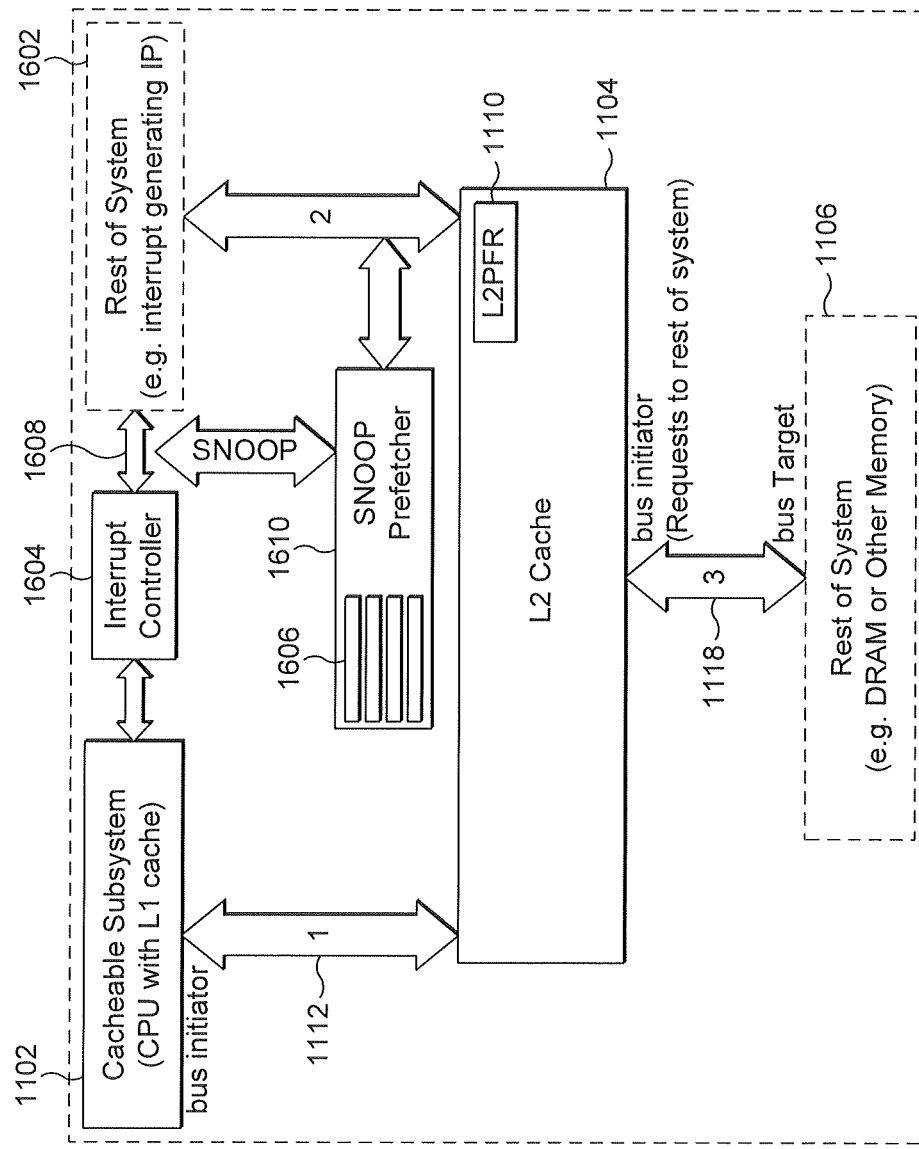
FIG. 8 shows a system topology comprising a level 2 cache for a further embodiment.

The procedure following a write to the L2PFR 108 is outlined in the flow diagram in FIG. 5, with further reference to FIG. 7 which illustrates internal logic and buffering of the L2 cache. A write is made into the L2PFR in step S1302. This is interpreted as a request to fetch the address into the L2 cache. The operand is latched into the target 2 incoming buffer (1502 in FIG. 7) and transferred to the first part of the control pipeline C1 (1504) whereupon logic signals are generated such that the address is looked-up in the tags (see 1204 of FIG. 5).

A lookup of the L2PFR is made in step S1304. If the lookup of the L2PFR address does yields a match (in step S1306), as indicated by assertion of the "HIT" signal (1216 in FIG. 5) then this indicates that the data is already held in the cache and no further action is taken.

If the lookup of the L2PFR address does not yield a match this is indicated by de-assertion of the HIT signal (1216 in FIG. 5). In this case a fetch request is passed to the refill engine (1214 in FIG. 5) in step S1308. The refill engine ensures that an appropriate entry is added to the bus queue (1506) and also to the Pending request buffer (1508). The Pending request buffer holds address and allocation attributes of all outstanding requests.

Entries in the bus queue (1506) will eventually be realized as memory requests on the system interconnect (1118 in FIG. 3) in a standard manner. The request will eventually illicit a response containing the requested data in step S1310. The requested data is buffered in the response queue (1510). The request attributes contained in the pending request buffer (1508) are used to identify where in the cache the pre-fetched data is to be located and the tag which is to accompany it into the cache (step S1312). The data and tags are loaded into the cache using the line fill buffer (1512).

If the L2 cache is operated in copy-back mode there is a possibility that the place selected for the fetched data was previously occupied by a cache line (the victim) which has been modified since being fetched from memory (i.e. is termed dirty). A dirty victim will require writing back to memory—a process sometimes referred to as eviction. In step S1314 it is checked whether the write-back is needed, and if so, in step S1316 the L2 arranges for the write-back in a manner common to the design of caches and utilizing a write-back buffer to hold the data whose place in the cache will have been taken by the pre-fetched data. In step S1318 the victim is replaced by the fetched data, and, in step S1320, the process halts.

There is also the possibility that the data to be pre-fetched, although not currently present in the cache, is in the process of being fetched into the cache by a preceding data access miss or indeed an earlier pre-fetch. For this reason, in addition to looking up in the TAG array of the cache the pre-fetch address must also search the pending request buffer 1508. If there is a match in the pending request buffer then the pre-fetch request is discarded and no further action is taken.

Data access misses to the L2PFR address which occur when the pre-fetch request is pending will be detected by searching the pending request buffer. The Pending request buffer is able to link together subsequent data accesses, so that when the fetched data returns it is able to be used to satisfy each of these accesses in turn. This functionality is easily implemented in standard logic and is known to the designers of caches which are able to deal with multiple misses.

FIG. 8 shows a system topology comprising a level 2 cache for a further embodiment. Referring to FIG. 8, the system comprises an L2 cache 1104 located between the CPU 1102 and the rest of the system 1106 via target port 1112 and system interconnect 1118, similar to that described above with reference to FIG. 3. The system in FIG. 8 further comprises a module capable of generating interrupts 1602 connected to the CPU 1102 via an interrupt controller 1604.

Each interrupt may be associated with a snoop pre-fetch register 1606. When an assertion is detected on an interrupt line 1608, the snoop pre-fetcher block 1610 will issue a write transaction to the L2PFR 1110 register address with an operand whose value is the content of the snoop pre-fetch register 1606 associated with the interrupt.

With appropriate software configuration it can be seen that interrupts will automatically lead to one or more cache lines being pre-fetched into the L2 cache. It is possible to integrate the interrupt snooping functional unit within the L2 cache in which case, the write to a pre-fetch register can be replaced by a simple logic signal to trigger the pre-fetch.

It is understood that the features of any of the embodiment described above may be used in any of the other embodiments, where this is possible and appropriate.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for pre-fetching data comprising:
    a cache memory configured to store a copy of a portion of data stored in a system memory; and
    an interrupt monitor configured to monitor interrupts, the interrupt monitor being connected to a path on which signals representing an interrupt are transmitted between one or more event generating modules and a processor via an interrupt controller on the path;
    said interrupt monitor being configured to detect an interrupt indicating an availability of the portion of data in the system memory, and initiate a pre-fetch of the portion of data from the system memory to the cache memory before the interrupt is forwarded to the processor by the interrupt controller.

2. The system according to claim 1, wherein the interrupt monitor is connected to the path between the one or more event generating modules and the interrupt controller.

3. The system according to claim 1, wherein the interrupt monitor is further configured to distinguish between different types of interrupts and initiate a data prefetch having characteristics based on the type of interrupt detected.

4. The system according to claim 3, wherein data pre-fetch characteristics includes one or more of: a memory address of the data to be pre-fetched; and a size of the portion of data being pre-fetched.

5. The system according to claim 3, wherein the interrupt monitor comprises a memory configured to store information associating each of one or more of the different types of interrupts with data pre-fetch characteristics; and in which the interrupt monitor, upon detecting an interrupt, is further configured to use the stored information to initiate a data pre-fetch having characteristics associated with the detected interrupt.

6. The system according to claim 1, wherein the interrupt monitor is further configured to detect an interrupt generated by a system module in response to the system module completing a transfer of a portion of data to a region of the system memory, and wherein the system is configured to pre-fetch the transferred portion of data upon detecting the interrupt.

7. The system according to claim 1, wherein the interrupt monitor comprises a pre-fetch memory, the system being arranged such that when a value is written to the pre-fetch memory, the system is configured to retrieve a portion of data stored in the system memory at a memory address defined by the value, and store the retrieved portion of data in the cache memory.

8. The system according to claim 1, wherein the interrupt monitor is a dedicated interrupt monitor.

9. The system according to claim 1, wherein the interrupt monitor is integrated into a cache memory system.

10. The system according to claim 1, wherein the system is part of a level 2 cache.

11. A method for pre-fetching data, the method comprising:
    monitoring interrupts on an interrupt path on which interrupt signals are transmitted between at least one interrupt generating module and a processor via an interrupt controller on the path; and
    initiating a pre-fetch of a portion of data in a system memory to a cache memory in response to detecting an interrupt indicating an availability of the portion of data in the system memory
    before the interrupt is forwarded to the processor by the interrupt controller.

12. An integrated circuit comprising:
    a cache memory configured to store a copy of data stored in a system memory; and
    an interrupt monitor configured to monitor interrupts, the interrupt monitor being connected to a path on which signals representing an interrupt are transmitted between at least one interrupt generating module and a processor via an interrupt controller on the path;
    the interrupt monitor being configured to detect an interrupt indicating an availability of a portion of data in the system memory, and initiate a pre-fetch of the portion of data from the system memory before the interrupt is forwarded to the processor.

13. The integrated circuit of claim 12 wherein the interrupt monitor is connected to the path between the at least one interrupt generating module and the interrupt controller.

14. The integrated circuit of claim 12 wherein the interrupt monitor is further configured to distinguish between different types of interrupts and initiate a data prefetch having characteristics based on the type of interrupt detected.

15. A system comprising:
    a system memory configured to store data;
    at least one module configured to generate an interrupt for a processor indicating an availability of a portion of data in the system memory, the processor configured to receive the interrupt and act upon the interrupt;
    an interrupt path connected between the at least one module and the processor;
    an interrupt controller on the interrupt path and configured to forward interrupts to the processor;
    a cache memory configured to store a copy of the portion of data stored in the system memory; and
    an interrupt monitor configured to monitor interrupts from the at least one module, the interrupt monitor being connected to the interrupt path;
    the interrupt monitor being configured to detect an interrupt indicating an availability of the portion of data in the system memory, and initiate a pre-fetch of the portion of data from the system memory to the cache memory before the interrupt is forwarded to the processor by the interrupt controller.

16. The system of claim 15 wherein the interrupt monitor is connected to the path between the at least one interrupt generating module and the interrupt controller.

17. The system of claim 15 wherein the interrupt monitor is further configured to distinguish between different types of interrupts and initiate a data pre-fetch having characteristics based on the type of interrupt detected.

* * * * *